US012726667B2

(12) United States Patent
Gaunt et al.

(10) Patent No.: US 12,726,667 B2
(45) Date of Patent: Sep. 1, 2026

(54) METHODS, SYSTEMS, AND MEDIA FOR SELECTING FORMATS FOR STREAMING MEDIA CONTENT ITEMS

(71) Applicant: Google LLC, Mountain View, CA (US)

(72) Inventors: Robert Gaunt, Pacifica, CA (US); Richard Leider, San Francisco, CA (US); Michael Smouha, San Francisco, CA (US); Matt Doucleff, San Bruno, CA (US); Steven Robertson, San Francisco, CA (US); Alexander Yakubovich, San Francisco, CA (US); Hsieh-Chung Chen, Mountain View, CA (US); Pawel Jurczyk, Newton, MA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/784,403

(22) PCT Filed: Dec. 11, 2019

(86) PCT No.: PCT/US2019/065681

§ 371 (c)(1),
(2) Date: Jun. 10, 2022

(87) PCT Pub. No.: WO2021/118557

PCT Pub. Date: Jun. 17, 2021

(65) Prior Publication Data

US 2023/0011528 A1 Jan. 12, 2023

(51) Int. Cl.
*H04N 21/25* (2011.01)
*H04N 21/2343* (2011.01)

(52) U.S. Cl.
CPC ... *H04N 21/252* (2013.01); *H04N 21/234363* (2013.01); *H04N 21/23439* (2013.01)

(58) Field of Classification Search
CPC ......... H04N 21/252; H04N 21/234363; H04N 21/23439; H04N 21/2402; H04N 21/2407;
(Continued)

(56) References Cited

U.S. PATENT DOCUMENTS 9,319,289 B2 4/2016 MacInnis et al.
9,451,306 B2 9/2016 Sarukkai et al.
(Continued)

FOREIGN PATENT DOCUMENTS

CN 102149005 8/2011
CN 104956645 9/2011
(Continued)

OTHER PUBLICATIONS

Examination Report dated Oct. 7, 2022 in IN Patent Application No. 202247037350.
(Continued)

*Primary Examiner* — Brian P Yenke
*Assistant Examiner* — Akshay Doshi
(74) *Attorney, Agent, or Firm* — Lowenstein Sandler LLP

(57) ABSTRACT

Mechanisms for selecting formats for streaming media content items are provided. In some embodiments, methods for selecting formats for streaming media content items are provided that include: receiving, at a server from a user device, a request to begin streaming a video content item on the user device; receiving, from the user device, network information indicating a quality of a network connection of the user device to a communication network used to stream the video content item and device information related to the user device; selecting, by the server, a first format for the video content item, wherein the first format includes a first resolution of a plurality of resolutions based on the network information and the device information; transmitting, from
(Continued)

the server, a first portion of the video content item having the first format to the user device; receiving, at the server from the user device, updated network information and updated device information; selecting, by the server, a second format for the video content item, wherein the second format includes a second resolution of the plurality of resolutions based on the updated network information and the updated device information; and transmitting, from the server, a second portion of the video content item having the second format to the user device.

21 Claims, 5 Drawing Sheets

(58) Field of Classification Search
CPC ....... H04N 21/25825; H04N 21/44209; H04N 21/4665; H04N 21/4666; H04N 21/4825; H04N 21/2662; G06N 3/08
See application file for complete search history.

(56) References Cited

U.S. PATENT DOCUMENTS 9,462,021 B2 * 10/2016 Ramamurthy ..... H04N 21/6373
9,615,098 B1 4/2017 Yi et al.
2002/0071052 A1 6/2002 Itoh et al.
2012/0331106 A1 12/2012 Ramamurthy et al.
2013/0174045 A1 * 7/2013 Sarukkai ............ G06Q 30/0255 715/744
2014/0201335 A1 * 7/2014 Wang ............... H04N 21/26258 709/219
2014/0282761 A1 * 9/2014 Bjordammen ... H04N 21/47214 725/92
2015/0089557 A1 3/2015 Busse
2015/0348493 A1 * 12/2015 Chae ........................ G09G 5/14 345/212
2016/0366202 A1 12/2016 Phillips et al.
2016/0366454 A1 * 12/2016 Tatourian .................. G06F 3/14
2017/0238040 A1 * 8/2017 Huysegems ....... H04N 21/8456 725/116
2018/0124146 A1 * 5/2018 Chen ....................... H04L 65/61
2018/0191801 A1 * 7/2018 Chen ..................... H04L 65/612
2019/0149863 A1 5/2019 Lewis et al.
2021/0027065 A1 * 1/2021 Chung ................... G06N 20/00
2022/0007067 A1 * 1/2022 Takahashi ............ H04N 17/004

FOREIGN PATENT DOCUMENTS

CN 105407107 3/2016
CN 107734356 A 2/2018
CN 108781300 11/2018
CN 108833995 11/2018
CN 110268717 9/2019
EP 0912061 B1 12/2010
EP 3211906 A1 8/2017
JP 2007151078 A 6/2007
JP 2009284282 A 12/2009
JP 2009290691 A 12/2009
JP 2015523805 A 8/2015
KR 101898822 B1 9/2018
KR 20190043599 A 4/2019
WO 2014113604 A1 7/2014
WO 2018057762 A1 3/2018

OTHER PUBLICATIONS

Office Action dated Jun. 22, 2023 in CN Patent Application No. 201980102576.X.
International Search Report and Written Opinion for International Application No. PCT/US2019/065681, mailed May 13, 2020, 12 Pages.
Office Action for Chinese Patent Application No. 201980102576.X, mailed Nov. 23, 2023, 9 Pages.
Office Action for Japanese Application No. JP20220535648, mailed Oct. 10, 2023, 20 Pages.
"Proposed text of ISO/IEC DIS 23009-5 as a results of CE SAND", 112, Mpeg Meeting, Jun. 22, 2015-Jun. 26, 2015, Warsaw, (Motion Picture Expert Group or ISO/IEC JTC1/SC29/WG11), No. N15542, Aug. 3, 2015 (Aug. 3, 2015), XP030022255.
Xin Wang et al: "Contribution to the Server and Network Assisted DASH Operation CE", 105, MPEG Meeting, Jul. 29, 2013-Feb. 8, 2013, Vienna, (Motion Picture Expert Group or ISO/IEC JTC1/SC29/WG11), No. m30357, Jul. 28, 2013 (Jul. 28, 2013), XP030058884.

* cited by examiner

METHODS, SYSTEMS, AND MEDIA FOR SELECTING FORMATS FOR STREAMING MEDIA CONTENT ITEMS

TECHNICAL FIELD

The disclosed subject matter relates to methods, systems, and media for selecting formats for streaming media content items.

BACKGROUND

Users frequently stream video content (e.g., videos, movies, television programs, music videos, etc.) from media content streaming services. A user device may use adaptive bitrate streaming, which can allow the user device to request different qualities of a video content item as the video content item is streamed from a server, thereby allowing the user device to continue presenting the video content item even as a quality of a network connection used to stream the video content item changes. For example, the user device may begin presenting segments of video content item that have a first, relatively high resolution, and, subsequently, in response to determining that the network connection has deteriorated, the user device can request segments of the video content item that have a second, lower resolution from the server. It can, however, be resource-intensive for a user device to determine an optimal format to be requested from the server. Additionally, the user device may request a particular format without regard to resources available to the server.

Accordingly, it is desirable to provide new methods, systems, and media for selecting formats for streaming media content items.

SUMMARY

Methods, systems, and media for selecting formats for streaming media content items are provided.

In accordance with some embodiments of the disclosed subject matter, a method for selecting formats for streaming media content items is provided, the method comprising: receiving, at a server from a user device, a request to begin streaming a video content item on the user device; receiving, from the user device, network information indicating a quality of a network connection of the user device to a communication network used to stream the video content item and device information related to the user device; selecting, by the server, a first format for the video content item, wherein the first format includes a first resolution of a plurality of resolutions based on the network information and the device information; transmitting, from the server, a first portion of the video content item having the first format to the user device; receiving, at the server from the user device, updated network information and updated device information; selecting, by the server, a second format for the video content item, wherein the second format includes a second resolution of the plurality of resolutions based on the updated network information and the updated device information; and transmitting, from the server, a second portion of the video content item having the second format to the user device.

In some embodiments, selecting the first format for the video content item comprises predicting, by the server, a format likely to be selected by a user of the user device.

In some embodiments, selecting the first format for the video content item comprises identifying, by the server, a format that maximizes a predicted duration of time a user of the user device will stream video content items.

In some embodiments, the updated device information includes an indication that a size of a viewport of a video player window executing on the user device in which the video content item is being presented has changed.

In some embodiments, the updated device information indicates that the size of the viewport has decreased, and wherein the second resolution is lower than the first resolution.

In some embodiments, the first format for the video content item is selected based on a genre of the video content item.

In some embodiments, the first format for the video content item is selected based on formats a user of the user device has previously selected for streaming other video content items from the server.

In accordance with some embodiments of the disclosed subject matter, a system for selecting formats for streaming media content items is provided, the system comprising a memory and a hardware processor that, when executing computer-executable instructions stored in the memory, is configured to: receive, at a server from a user device, a request to begin streaming a video content item on the user device; receive, from the user device, network information indicating a quality of a network connection of the user device to a communication network used to stream the video content item and device information related to the user device; select, by the server, a first format for the video content item, wherein the first format includes a first resolution of a plurality of resolutions based on the network information and the device information; transmit, from the server, a first portion of the video content item having the first format to the user device; receive, at the server from the user device, updated network information and updated device information; select, by the server, a second format for the video content item, wherein the second format includes a second resolution of the plurality of resolutions based on the updated network information and the updated device information; and transmit, from the server, a second portion of the video content item having the second format to the user device.

In accordance with some embodiments of the disclosed subject matter, a non-transitory computer-readable medium containing computer executable instructions that, when executed by a processor, cause the processor to perform a method for selecting formats for streaming media content items is provided, the method comprising: receiving, at a server from a user device, a request to begin streaming a video content item on the user device; receiving, from the user device, network information indicating a quality of a network connection of the user device to a communication network used to stream the video content item and device information related to the user device; selecting, by the server, a first format for the video content item, wherein the first format includes a first resolution of a plurality of resolutions based on the network information and the device information; transmitting, from the server, a first portion of the video content item having the first format to the user device; receiving, at the server from the user device, updated network information and updated device information; selecting, by the server, a second format for the video content item, wherein the second format includes a second resolution of the plurality of resolutions based on the updated network information and the updated device information; and transmitting, from the server, a second portion of the video content item having the second format to the user device.

In accordance with some embodiments of the disclosed subject matter, a system for selecting formats for streaming media content items is provided, the system comprising: means for receiving, at a server from a user device, a request to begin streaming a video content item on the user device; means for receiving, from the user device, network information indicating a quality of a network connection of the user device to a communication network used to stream the video content item and device information related to the user device; means for selecting, by the server, a first format for the video content item, wherein the first format includes a first resolution of a plurality of resolutions based on the network information and the device information; means for transmitting, from the server, a first portion of the video content item having the first format to the user device; means for receiving, at the server from the user device, updated network information and updated device information; means for selecting, by the server, a second format for the video content item, wherein the second format includes a second resolution of the plurality of resolutions based on the updated network information and the updated device information; and means for transmitting, from the server, a second portion of the video content item having the second format to the user device.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
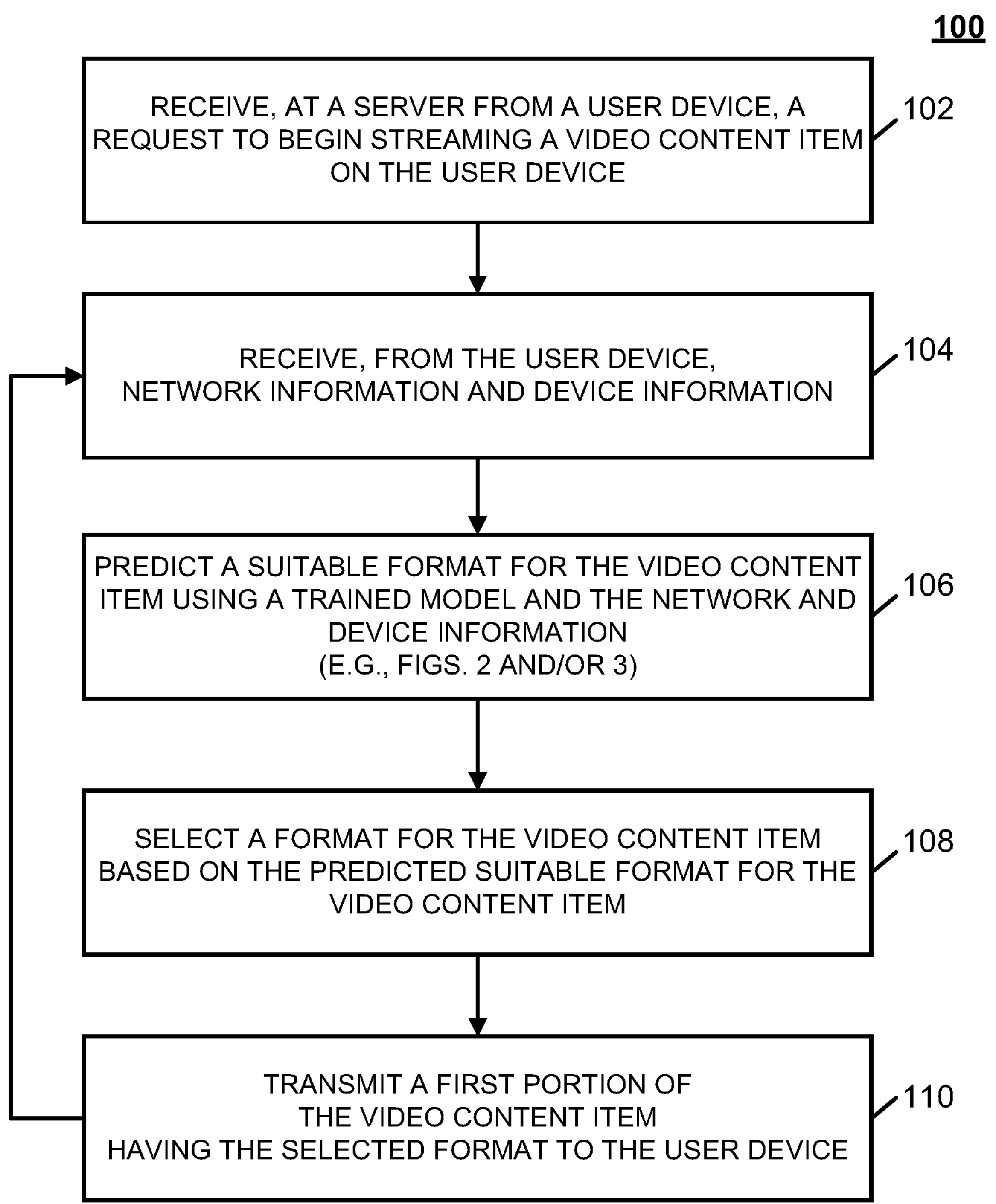
FIG. 1 shows an illustrative example of a process for selecting a format of a video content item in accordance with some embodiments of the disclosed subject matter.

In accordance with various embodiments, mechanisms (which can include methods, systems, and media) for selecting formats for streaming media content items are provided.

In some embodiments, the mechanisms described herein can select, by a server, a format (e.g., a particular resolution, and/or any other suitable format) of a video content item to be streamed to a user device based on information such as a current quality or type of a network connection used by the user device to stream the video content item, a type of device associated with the user device, video content formats previously selected by a user of the user device, and/or any other suitable information. In some embodiments, the server can then begin streaming the video content item to the user device with the selected format. In some embodiments, the server can receive updated information from the user device that indicates any suitable changes, such as changes in a quality of the network connection. In some embodiments, the server can then select a different format based on the updated information and can switch to streaming the video content item with the selected different format.

For example, in some embodiments, the server can begin streaming a video content item to a user device with a first resolution (e.g., 360 pixels×640 pixels, and/or any other suitable first resolution) that was selected based on network information, device information, and/or any other suitable information. Continuing with this example, in some embodiments, the server can receive, from the user device, information indicating a change in a state of streaming of the video content item. For example, the server can receive information indicating a change in a quality of the network connection, a change in a size of a viewport of a video player window executing on the user device, and/or any other suitable change. Continuing further with this example, in some embodiments, the server can then select a second resolution based on the change in the state of streaming of the video content item. For example, in an instance in which the server receives information indicating that a quality of the network connection has degraded, the server can switch to streaming the video content item with a lower resolution than the first resolution. Conversely, in an instance in which the server receives information indicating that the quality of the network connection has improved, the server can switch to streaming the video content item with a higher resolution than the first resolution. As another example, in an instance in which the server receives information indicating that a size of the viewport of the video player window has increased, the server can switch to streaming the video content item with a higher resolution than the first resolution. Conversely, in an instance in which the server receives information indicating that the size of the viewport has decreased, the server can switch to streaming the video content item with a lower resolution than the first resolution.

In some embodiments, the server can select the format using any suitable technique or combination of techniques. For example, in some embodiments, the server can select a format that is predicted to be a format that would be selected manually by a user when streaming a video content item under similar network conditions and/or using a similar user device. As a more particular example, in some embodiments, the server can use a trained model (e.g., a trained decision tree, a trained neural network, and/or any other suitable model) that was trained using training samples each corresponding to a streamed video content item, where each training sample includes any suitable input features (e.g., network conditions under which the video content item was streamed, information related to a user device that streamed the video content item, information about the video content item, and/or any other suitable information) and a corresponding user-selected format, as shown in and described below in connection with FIG. 2. As another example, in some embodiments, the server can select a format that is predicted to maximize any suitable quality score that predicts a quality of streaming the video content item to a user device under particular conditions. As a more particular example, in some embodiments, the server can use a trained model (e.g., a trained decision tree, a trained neural network, and/or any other suitable model) that was trained using training samples each corresponding to a streamed video content item, where each training sample includes any suitable input features (e.g., network conditions under which the video content item was streamed, information related to a user device that streamed the video content item, information about the video content item, and/or any other suitable information) and a corresponding quality score, as shown in and described below in connection with FIG. 3. Note that, in some embodiments, the quality score can be based on any suitable metric or combination of metrics, such as a duration of time a user watched video content items including the video content item associated with the training sample during a video content viewing session, a duration of time the user watched the video content item associated with the training sample, a latency the user experienced between streaming two video content items, and/or any other suitable metric or combination of metrics.

In some embodiments, by using a trained model to select a format of a video content item to be streamed, the mechanisms described herein can allow a server to select a format that optimizes any suitable objective(s), such as selecting a format likely to be manually selected by a user of a user device streaming the video content item, a format that maximizes a duration of time the user of the user device views video content items, and/or any other suitable objective(s). Additionally, in some embodiments, the mechanisms can allow the server to change a format of a video content item being streamed to a user device during streaming of the video device based on any suitable change(s), such as a change in network conditions, a change in a size of a viewport of a video player window used to present the video content item, and/or any other suitable changes. In some embodiments, by changing the format of the video content item during streaming of the video content item, the mechanisms can dynamically adapt the format of the video content item such that any suitable objectives continue to be optimized during changing streaming conditions.

Note that, although the mechanisms described herein generally related to a server selecting a particular quality of a video content item that is to be streamed to a user device by selecting a particular format or resolution of the video content item, in some embodiments, quality of video content can be indicated using any suitable other metric(s), such as Video Multimethod Assessment Fusion (VMAF), and/or any other suitable metric(s).

Turning to FIG. 1, an illustrative example 100 of a process for selecting a format of a video content item is shown in accordance with some embodiments of the disclosed subject matter. In some embodiments, blocks of process 100 can be executed by any suitable device. For example, in some embodiments, blocks of process 100 can be executed by a server associated with a video content streaming service.

Process 100 can begin at 102 by receiving, at a server from a user device, a request to begin streaming a video content item on the user device. As described above, in some embodiments, the server can be associated with any suitable entity or service, such as a video content streaming service, a social networking service, and/or any other suitable entity or service. In some embodiments, the server can receive the request to begin streaming the video content item in any suitable manner. For example, in some embodiments, the server can receive the request from the user device in response to determining that a user of the user device has selected an indication of the video content item (e.g., an indication presented in a page for browsing video content items, and/or selected in any other suitable manner). As another example, in some embodiments, the server can receive an indication that the video content item is a subsequent video content item in a playlist of video content items that are to be presented sequentially on the user device.

At 104, process 100 can receive, from the user device, network information and device information. In some embodiments, the network information can include any suitable metrics that indicate a quality of a connection of the user device to a communication network used by the user device to stream the video content item from the server and/or any suitable information about a type of network used. For example, in some embodiments, the network information can include a bandwidth of the connection, a throughput of the connection, a goodput of the connection, a latency of the connection, a type of connection being used (e.g., an Ethernet connection, a 3G connection, a 4G connection, a Wi-Fi connection, and/or any other suitable type of network), a type of communication protocol being used (e.g., HTTP, and/or any other suitable type of protocol), any suitable network identifiers (e.g., an Autonomous System Number (ASN), and/or any other suitable identifier(s)), and/or any other suitable network information. In some embodiments, the device information can include any suitable information about the user device or information about a manner in which the user device is to stream the video content item. For example, in some embodiments, the device information can include a type or model of the user device, an operating system being used by the user device, a current geographic location of the user device (e.g., indicated by an IP address associated with the user device, indicated by current GPS coordinates associated with the user device, and/or indicated in any other suitable manner), an interface being used by the user device to stream the video content item (e.g., a web browser, a particular media content streaming application executing on the user device, and/or any other suitable interface information), a screen size or resolution of a display associated with the user device, a size of a viewport associated with a video player window in which the video content item is to be presented on the user device, and/or any other suitable information.

At 106, process 100 can predict a suitable format for the video content item using a trained model and the network and/or device information received at block 104. In some embodiments, the format can include any suitable information, such as a resolution of a frame of the video content item (e.g., 144 pixels×256 pixels, 240 pixels×426 pixels, 360 pixels×640 pixels, 480 pixels×854 pixels, 720 pixels×1280 pixels, 1080 pixels×1920 pixels, and/or any other suitable resolution).

In some embodiments, process 100 can predict the suitable format for the video content item in any suitable manner. For example, in some embodiments, process 100 can predict the suitable format for the video content item for streaming by the user device using a model that was trained using training data that indicates user-selected formats when streaming video content items with different user device and/or under different network conditions, as shown in and described below in connection with FIG. 2. As shown in and described below in connection with FIG. 2, in some embodiments, such a model can take, as inputs, user device information and network information, and can predict, as an output, a format likely to be selected by a user given the input user device information and network information.

As another example, in some embodiments, process 100 can predict the suitable format for the video content item for streaming by the user device using a model that was trained using training data that indicates a quality metric associated with streaming video content items using particular formats for different user devices and/or under different network conditions, as shown in and described below in connection with FIG. 3. As shown in and described below in connection with FIG. 3, in some embodiments, such a model can take, as inputs, device information, network information, and video content item format, and can predict, as an output, a predicted quality score associated with streaming a video content item with the video content item format to a user device associated with the device information and network information. In some such embodiments, the model can then be used to predict a format that is likely to maximize the quality score. Note that, in some embodiments, the quality score can include any suitable metrics that indicate a quality of streaming of the video content item. For example, as described below in more detail in connection with FIG. 3, in some embodiments, the quality score can include a watch-time metric, which can indicate an average duration of time a video content item is watched before presentation of the video content item is stopped. As another example, as described below in more detail in connection with FIG. 3, in some embodiments, the quality score can include an occupancy metric, which can be defined as (elapsed watch-time of a next video content item)/(elapsed watch-time of a next video content item+latency between presentation of the current video content item and the next video content item).

Note that, in some embodiments, as described below in more detail in connection with FIGS. 2 and 3, the trained model can use any suitable features other than those related to network information or device information to predict the suitable format for the video content item. For example, in some embodiments, the trained model can use input features related to previous user actions (e.g., previously selected formats by a user of the user device, and/or any other suitable user actions), information related to a user account of the user that is used to stream video content (e.g., information related to a subscription by the user to a video content streaming service, information related to a billing cycle for payment of a subscription to a video content streaming service, and/or any other suitable user account information), information related to the video content item (e.g., a genre or topic of the video content item, a duration of the video content item, a popularity of the video content item, and/or any other suitable video content item information), and/or any other suitable information.

At 108, process 100 can select a format for the video content item based on the predicted suitable format for the video content item. In some embodiments, process 100 can select the format for the video content item in any suitable manner. For example, in some embodiments, process 100 can select the format for the video content item to be the same as the predicted suitable format. As a more particular example, in some embodiments, in an instance in which process 100 predicts a suitable format as a particular resolution, process 100 can select the format as the particular resolution. As another example, in some embodiments, process 100 can select the format for the video content item based on the predicted suitable format and subject to any suitable rules or criteria. As a more particular example, in some embodiments, process 100 can select the format for the video content item subject to rules that indicate a maximum resolution that can be used based on a current viewport size of a video player window used by the user device. As a specific example, in an instance in which the predicted suitable format is a particular resolution (e.g., 720 pixels×1280 pixels), and in which the user device information received at block 104 indicates that a current size of the viewport is relatively small, process 100 can select the format as a resolution that is lower than the resolution associated with the predicted suitable format (e.g., 360 pixels×640 pixels, 240 pixels×426 pixels, and/or any other suitable lower resolution). As another more particular example, in some embodiments, process 100 can select the format for the video content item subject to rules that indicate a maximum resolution for particular types of video content (e.g., music videos, lectures, documentaries, etc.). As a specific example, in an instance in which the predicted suitable format is a particular resolution (e.g., 720 pixels×1280 pixels), and in which the video content item is determined to be a music video, process 100 can select the format as a resolution that is lower than the resolution associated with the predicted suitable format (e.g., 360 pixels×640 pixels, 240 pixels×426 pixels, and/or any other suitable lower resolution). As yet another more particular example, in some embodiments, process 100 can select the format for the video content item based on locations of video content items of different resolutions. As a specific example, in an instance in which the predicted suitable format is a particular resolution (e.g., 720 pixels×1280 pixels), and in which the video content item having the predicted suitable format is stored in a remote cache (e.g., that is more expensive to access than a local cache), process 100 can select a format corresponding to a version of the video content item stored in a local cache. Note that, in some embodiments, process 100 can select the format for the video content item based on any suitable rules that indicate, for example, a maximum or minimum resolution associated with any conditions (e.g., network conditions, device conditions, user subscription conditions, conditions related to different types of video content, and/or any other suitable types of conditions).

At 110, process 100 can transmit a first portion of the video content item having the selected format to the user device. Note that, in some embodiments, the first portion of the video content item can have any suitable size (e.g., a particular number of kilobytes or megabytes, and/or any other suitable size) and/or can be associated with any suitable duration of the video content item (e.g., five seconds, ten seconds, and/or any other suitable duration). In some embodiments, process 100 can calculate a size or duration of the first portion of the video content item in any suitable manner, such as based on a buffer size used by the user device to store the video content item during streaming of the video content item. In some embodiments, process 100 can transmit the first portion of the video content item in any suitable manner. For example, in some embodiments, process 100 can use any suitable streaming protocol to transmit the first portion of the video content item. As another example, in some embodiments, process 100 can transmit the first portion of the video content item in connection with an indication of a condition under which the user device is to request an additional portion of the video content item from the server. As a more particular example, in some embodiments, process 100 can transmit the first portion of the video content item in connection with a minimum buffer amount at which the user device is to request additional portions of the video content item. As yet another example, in some embodiments, process 100 can transmit the first portion of the video content item in connection with an instruction to transmit information from the user device to the server in response to detecting a change in a quality of the network connection (e.g., that the bandwidth of the network connection has changed, that the throughput or goodput of the network connection has changed, and/or any other suitable network connection change) or a change in a state of the device (e.g., a change in a size of the viewport of the video player window presenting the video content item, and/or any other suitable device state change).

In some embodiments, process 100 can return to block 104 and can receive, from the user device, updated network information (e.g., that a quality of the network connection has improved, that a quality of the network connection has degraded, and/or any other suitable updated network information) and/or updated device information (e.g., that a size of a viewport of a video player window used by the user device to present the video content item has changed, and/or any other suitable device information). In some such embodiments, process 100 can loop through blocks 104-110 and can predict an updated suitable format based on the updated network information and device information, select an updated format based on the predicted updated suitable format, and can transmit a second portion of the video content item having the selected updated format to the user device. In some embodiments, process 100 can loop back to block 104 in response to any suitable information and/or at any suitable frequency. For example, in some embodiments, process 100 can loop through blocks 104-110 at any suitable set frequency such that additional portions of the video content item are transmitted to the user device at a predetermined frequency. As another example, in some embodiments, process 100 can loop back to block 104 in response to receiving a request from the user device for an additional portion of the video content item (e.g., a request transmitted from the user device in response to the user device determining that an amount of the video content item remaining in a buffer of the user device is below a predetermined threshold, and/or a request transmitted from the user device in response to any other suitable information). As yet another example, in some embodiments, process 100 can loop back to block 104 in response to receiving information from the user device that indicates a change in a state of streaming the video content item. Note that, in some embodiments, by looping through blocks 104-110, process 100 can cause the format of the video content item to be changed multiple times during presentation of the video content item by the user device.

Figure 2:
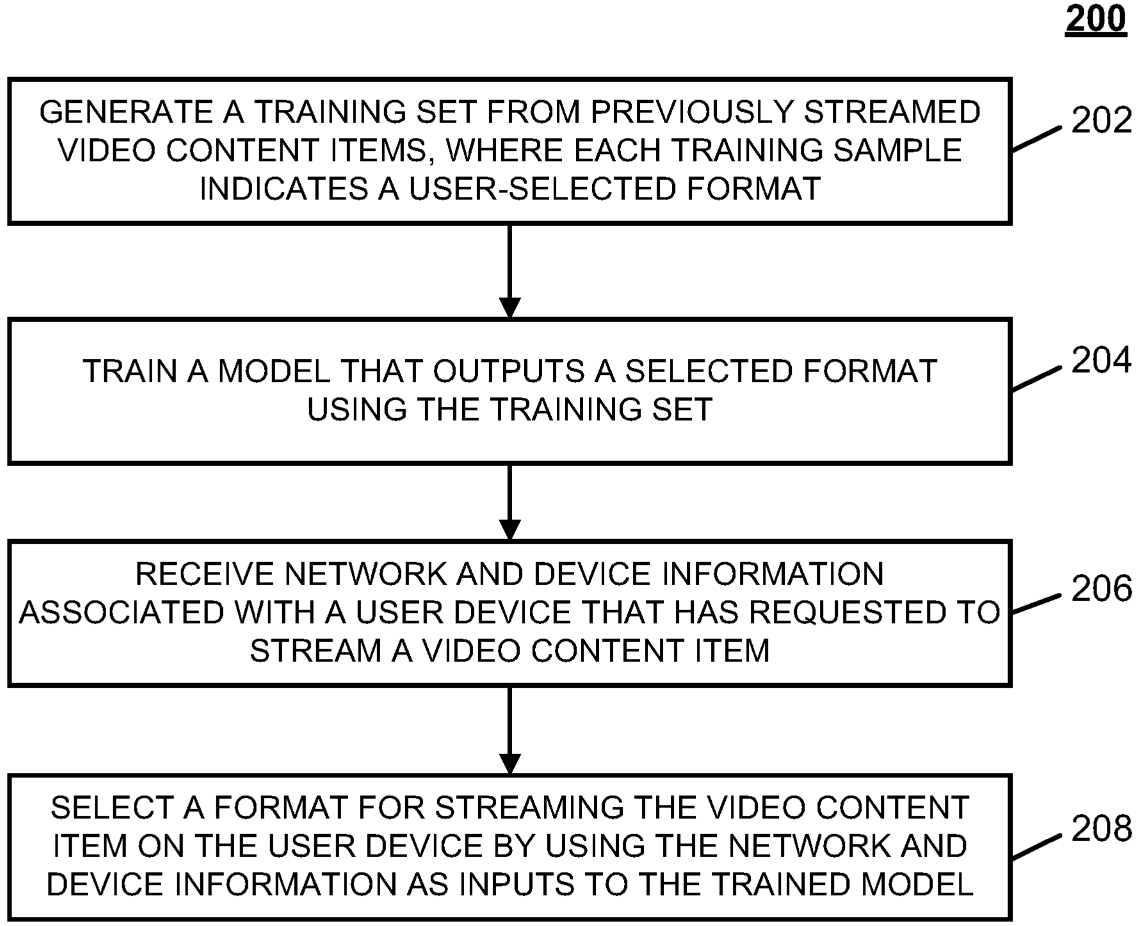
FIG. 2 shows an illustrative example of a process for training a model to select a format of a video content item based on previously selected formats in accordance with some embodiments of the disclosed subject matter.

Turning to FIG. 2, an illustrative example 200 of a process for training a model to predict a video content item format based on previously selected formats is shown in accordance with some embodiments of the disclosed subject matter. In some embodiments, blocks of process 200 can be executed by any suitable device, such as a server that stores and/or streams video content items to user devices (e.g., a server associated with a video content sharing service, a server associated with a social networking service, and/or any other suitable server).

Process 200 can begin at 202 by generating a training set from previously streamed video content items, where each training sample in the training set indicates a user-selected format for the corresponding video content item. In some embodiments, each training sample can correspond to a video content item streamed to a particular user device. In some embodiments, each training sample can include any suitable information. For example, in some embodiments, a training sample can include information indicating network conditions associated with a network connection through which the video content item was streamed to the user device (e.g., a throughput of the connection, a goodput of the connection, a bandwidth of the connection, a type of connection, a round trip time (RTT) of the connection, a network identifier (e.g., an ASN, and/or any other suitable identifier), a bitrate used for streaming the video content item, an Internet Service Provider (ISP) associated with the user device, and/or any other suitable network information). As another example, in some embodiments, a training sample can include device information associated with the user device used to stream the media content item (e.g., a model or type of the user device, a display size or resolution associated with a display of the user device, a geographic location of the user device, an operating system used by the user device, a size of a viewport of a video player window used to present the video content item, and/or any other suitable device information). As yet another example, in some embodiments, a training sample can include information related to the video content item being streamed (e.g., a genre or category of the video content item, a duration of the video content item, a resolution at which the video content item was uploaded to the server, a highest available resolution for the video content item, and/or any other suitable information related to the video content item). As still another example, in some embodiments, a training sample can include information related to a user of the user device (e.g., information about a data plan used by the user, information about a billing cycle for a video streaming subscription purchased by the user, an average or total duration of video content watch time by the user over any suitable duration of time, a total number of video content item playbacks by the user over any suitable duration of time, and/or any other suitable user information.

In some embodiments, each training sample can include a corresponding format for the video content item that was manually selected by the user during streaming of the video content item. For example, in some embodiments, the corresponding format can include a resolution selected by the user for streaming of the video content item. Note that, in some embodiments, in instances in which the user of the user device changed a resolution of the video content item during streaming of the video content item, the format can correspond to a weighted resolution that indicates, for example, an average resolution of the different resolutions the video content item was presented at weighted by durations of time each resolution was used. Additionally, note that, in instances in which the user of the user device changed a resolution of the video content item during streaming of the video content item, the training sample can include a history of user-selected resolutions for the video content item.

At 204, process 200 can train a model that produces, as an output, a selected format for a video content item using the training samples in the training set. That is, in some embodiments, the model can be trained to predict, for each training sample, the format that was manually selected by the user for streaming the video content item corresponding to the training sample. Note that, in some embodiments, the trained model can generate a selected format in any suitable manner. For example, in some embodiments, the model can be trained to output a classification that corresponds to a particular resolution associated with the selected format. As another example, in some embodiments, the model can be trained to output continuous values that correspond to a target resolution, and the model can then subsequently generate the selected format by quantizing the target resolution values to an available resolution. Note that, in some embodiments, in instances in which process 200 trains a model that generates a classification corresponding to a particular output resolution, the model can generate a classification from any suitable group of potential resolutions (e.g., 144 pixels×256 pixels, 240 pixels×426 pixels, 360 pixels×640 pixels, 480 pixels×854 pixels, 720 pixels×1280 pixels, 1080 pixels×1920 pixels, and/or any other suitable resolution).

In some embodiments, process 200 can train a model with any suitable architecture. For example, in some embodiments, process 200 can train a decision tree. As a more particular example, in some embodiments, process 200 can train a classification tree to generate a classification of a resolution to be used. As another example, in some embodiments, process 200 can train a regression tree that generates continuous values that indicate a target resolution, which can then be quantized to generate an available resolution for a video content item. In some embodiments, process 200 generate a decision tree model that partitions the training set data based on any suitable features using any suitable technique or combination of techniques. For example, in some embodiments, process 200 can use any suitable algorithm(s) that identify input features along which branches of the tree are to be formed based on information gain, Gini impurity, and/or based on any other suitable metrics. As another example, in some embodiments, process 200 can train a neural network. As a more particular example, in some embodiments, process 200 can train a multi-class perceptron that generates a classification of a resolution to be used. As another more particular example, in some embodiments, process 200 can train a neural network to output continuous values of a target resolution, which can then be quantized to generate an available resolution for a video content item. Note that, in some such embodiments, any suitable parameters can be used by process 200 to train the model, such as any suitable learning rate, etc. Additionally, note that, in some embodiments, the training set generated at block 202 can be split into a training set and a validation set, which can be used to refine the model.

Note that, in some embodiments, the model can use any suitable input features and any suitable number of input features (e.g., two, three, five, ten, twenty, and/or any other suitable number). For example, in some embodiments, the model can use input features corresponding to particular network quality metrics (e.g., a bandwidth of a network connection, a throughput or a goodput of the network connection, a latency of the network connection, and/or any other suitable network quality metrics), features corresponding to a network type (e.g., Wi-Fi, 3G, 4G, Ethernet, and/or any other suitable type), features corresponding to device information (e.g., display resolution, device type or model, device operating system, device geographic location, viewport size, and/or any other suitable device information), features corresponding to user information (e.g., user subscription information, previously selected formats, and/or any other suitable user information), and/or features corresponding to video content information (e.g., video content item duration, video content item popularity, video content item topic or genre). Additionally, note that, in some embodiments, input features can be selected in any suitable manner and using any suitable technique(s).

At 206, process 200 can receive network information and device information associated with a user device that has requested to stream a video content item. Note that, in some embodiments, the user device may or may not be represented in the training set generated at block 202 as described above. As described above in connection with block 104 of FIG. 1, in some embodiments the network information can include any suitable information related to a network connection used by the user device to stream the video content item, such as a bandwidth of the connection, a latency of the connection, a throughout and/or a goodput of the connection, a type of connection (e.g., 3G, 4G, Wi-Fi, Ethernet, and/or any other suitable type of connection), and/or any other suitable network information. As described above in connection with block 104 of FIG. 1, in some embodiments, the device information can include any suitable information related to the user device, such as a model or type of user device, an operating system used by the user device, a size or resolution of a display associated with the user device, a size of a viewport of a video player window in which the video content item is to be presented, and/or any other suitable device information. Additionally, in some embodiments, process 200 can receive any suitable information related to the video content item (e.g., a topic or genre associated with the video content item, a duration of the video content item, a popularity of the video content item, and/or any other suitable video content item information), information related to a user of the user device (e.g., billing information associated with the user, information related to a subscription of the user to a video content streaming service providing the video content item, information indicating previous playback history of the user, and/or any other suitable user information), and/or information indicating formats or resolutions of video content items previously selected by the user of the user device to stream other video content items.

At 208, process 200 can select a format for streaming the video content item using the trained model. In some embodiments, process 200 can use the trained model in any suitable manner. For example, in some embodiments, process 200 can generate an input corresponding to input features used by the trained model and based on the network and device information received by process 200 at block 206 and can generate an output that indicates a resolution of the video content item using the generated input. As a more particular example, in an instance in which the trained model takes, as inputs, a throughput of a network connection, a geographic location of the user device, a size of a viewport of a video player window presented on the user device, and an operating system of the user device, process 200 can generate an input vector that includes the input information required by the trained model. Continuing with this example, process 200 can then use the trained model to generate, as an output, a target resolution that represents a format likely to be selected by a user when streaming a video content item under the conditions indicated by the input vector.

Note that, in instances in which the trained model generates continuous values that correspond to a target resolution (e.g., continuous values that represent heights and/or widths of a target resolution), process 200 can quantize the continuous values to correspond to an available resolution of the video content item. For example, in some embodiments, process 200 can select an available resolution of the video content item that is closest to the continuous values generated by the trained model. As a more particular example, in an instance in which the trained model generates a target resolution of 718 pixels×1278 pixels, process 200 can determine that a closest available resolution is 720 pixels×1280 pixels.

Figure 3:
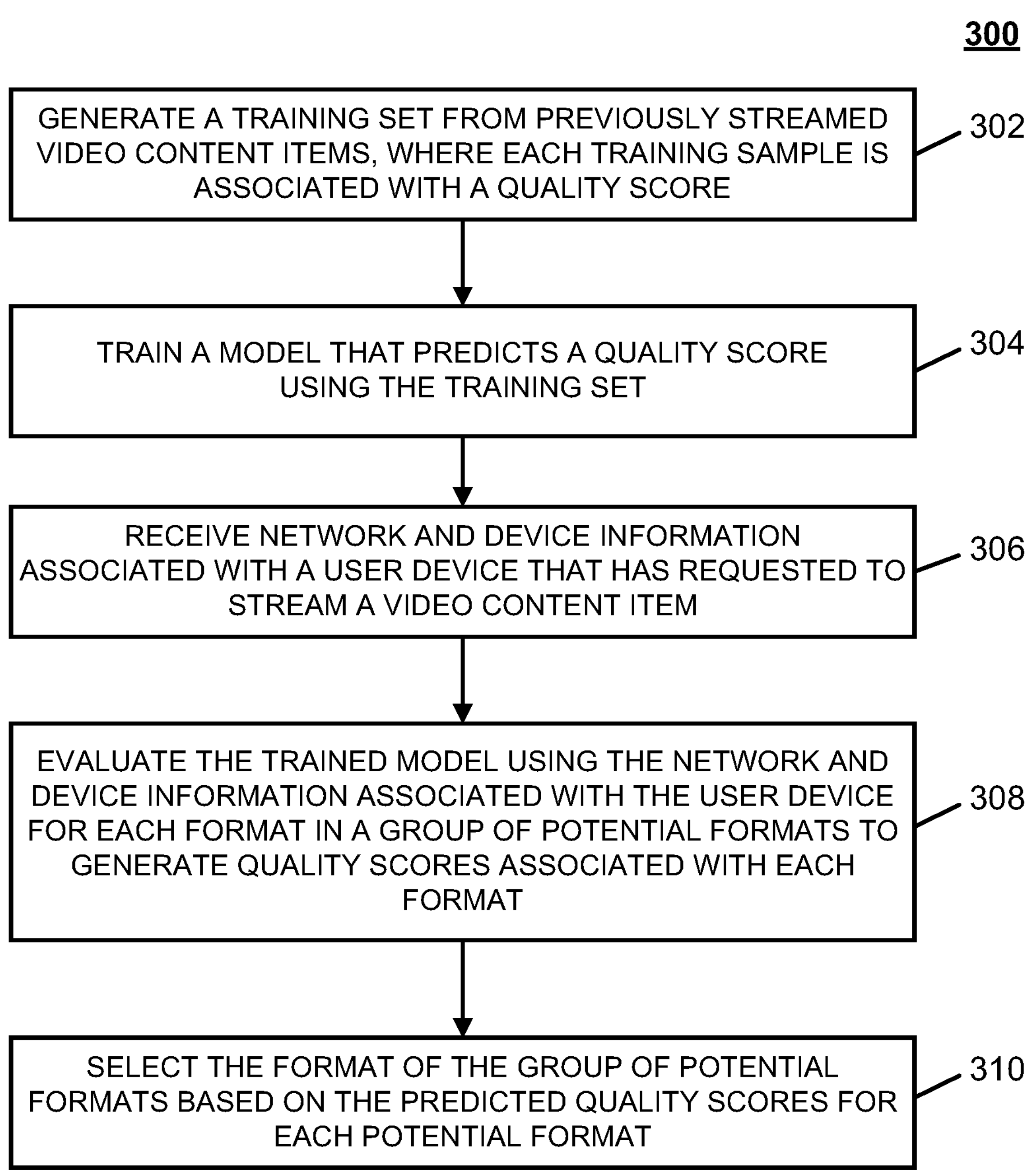
FIG. 3 shows an illustrative example of a process for training a model to select a format of a video content item based on quality scores associated with streaming video content items with different formats in accordance with some embodiments of the disclosed subject matter.

Turning to FIG. 3, an illustrative example 300 of a process for training a model to predict a quality score associated with streaming a video content item with a particular format is shown in accordance with some embodiments of the disclosed subject matter. In some embodiments, blocks of process 300 can be executed by any suitable device, such as a server that stores and/or streams video content items to user devices (e.g., a server associated with a video content sharing service, a server associated with a social networking service, and/or any other suitable server).

Process 300 can begin at 302 by generating a training set from previously streamed video content items, where each training sample is associated with a quality score that represents a quality of streaming of the video content item with a particular format. In some embodiments, each training sample can correspond to a video content item streamed to a particular user device. In some embodiments, each training sample can include any suitable information. For example, in some embodiments, a training sample can include information indicating network conditions associated with a network connection through which the video content item was streamed to the user device (e.g., a throughput of the connection, a goodput of the connection, a bandwidth of the connection, a type of connection, a round trip time (RTT) of the connection, a network identified (e.g., an ASN, and/or any other suitable identifier), a bitrate used for streaming the video content item, an Internet Service Provider (ISP) associated with the connection, and/or any other suitable network information). As another example, in some embodiments, a training sample can include device information associated with the user device used to stream the media content item (e.g., a model or type of the user device, a display resolution associated with a display of the user device, a geographic location of the user device, an operating system used by the user device, a size of a viewport of a video player window on the user device in which the video content item is presented, and/or any other suitable device information). As yet another example, in some embodiments, a training sample can include information related to the video content item being streamed (e.g., a genre or category of the video content item, a duration of the video content item, a resolution at which the video content item was uploaded to the server, a highest available resolution for the video content item, and/or any other suitable information related to the video content item). As still another example, in some embodiments, a training sample can include information related to a user of the user device (e.g., information about a data plan used by the user, information about a billing cycle for a video streaming subscription purchased by the user, an average or total duration of video content watch time by the user over any suitable duration of time, a total number of video content item playbacks by the user over any suitable duration of time, and/or any other suitable user information.

In some embodiments, each training sample can include a format at which the video content item was streamed to the user device. For example, in some embodiments, the format can include a resolution of the video content item at which the video content item was streamed to the user device. Note that, in instances in which the resolution of the video content item was changed during presentation of the video content item, the resolution can be a weighted resolution that corresponds to an average of the different resolutions of the video content item weighted by a duration of time each resolution was used.

In some embodiments, each training sample can be associated with a corresponding quality score that indicates a quality of streaming the video content item at the resolution (or weighted resolution) indicated in the training sample. In some embodiments, the quality score can be calculated in any suitable manner. For example, in some embodiments, the quality score can be calculated based on a watch-time that indicates a duration of time video content items were watched. As a more particular example, in some embodiments, the quality score can be based on a total duration of time video content items were watched during a video content streaming session in which the video content item of the training sample was streamed. As a specific example, in an instance in which the video content item of the training sample was streamed during a video content streaming session that lasted for thirty minutes, the quality score can be based on a session watch-time duration of thirty minutes. As another more particular example, in some embodiments, the quality score can be based on a duration of time the video content item of the training sample was watched or a percentage of the video content item that was watched prior to stopping presentation of the video content item. As a specific example, in an instance in which 50% of the video content item of the training sample was watched by a user of the user device prior to stopping presentation of the video content item, the quality score can be based on 50% of the video content item being watched.

As another example, in some embodiments, the quality score can be calculated based on an occupancy score that indicates an effect of a duration of a latency between presentation of two video content items. In some embodiments, an example of an occupancy score that can be used to calculate the quality score is: occupancy score=(elapsed watch-time of next video content item)/(elapsed watch-time of next video content item+latency or gap between current video content item and next video content item). Note that, in some embodiments, the video content item corresponding to the training sample can be either the current video content item referred to in the occupancy score metric or the next video content item referred to in the occupancy score metric.

Note that, in some embodiments, the quality score can be a function of a watch-time metric (e.g., a duration of time the video content item was watched, a percentage of the video content item that was watched, a duration of time video content items were watched in a video content streaming session, and/or any other suitable watch-time metric) or a function of an occupancy metric. In some embodiments, the function can be any suitable function. For example, in some embodiments, the function can be any suitable saturation function (e.g., a sigmoid function, a logistic function, and/or any other suitable saturation function.

At 304, process 300 can train a model that predicts a quality score based on network information, device information, user information, and/or video content information using the training set. Similar to what is described above in connection with block 204 of FIG. 2, in some embodiments, process 300 can train a model with any suitable architecture. For example, in some embodiments, process 300 can train a decision tree. As a more particular example, in some embodiments, process 300 can train a classification tree to generate a classification that a quality score is within a particular range (e.g., within 0-0.2, within 0.21-0.4, and/or any other suitable ranges). As another example, in some embodiments, process 300 can train a regression tree that generates continuous values that indicate a predicted quality score. In some embodiments, process 300 can generate a decision tree model that partitions the training set data based on any suitable features using any suitable technique or combination of techniques. For example, in some embodiments, process 300 can use any suitable algorithm(s) that identify input features along which branches of the tree are to be formed based on information gain, Gini impurity, and/or based on any other suitable metrics.

As another example, in some embodiments, process 300 can train a neural network. As a more particular example, in some embodiments, process 300 can train a multi-class perceptron that generates a classification of a quality score as being within a particular range, as described above. As another more particular example, in some embodiments, process 300 can train a neural network to output continuous values of a predicted quality score. Note that, in some such embodiments, any suitable parameters can be used by process 300 to train the model, such as any suitable learning rate, etc. Additionally, note that, in some embodiments, the training set generated at block 302 can be split into a training set and a validation set, which can be used to refine the model.

At 306, process 300 can receive network information and device information associated with a user device that has requested to stream a video content item. Note that, in some embodiments, the user device may or may not be represented in the training set generated at block 302 as described above. As described above in connection with block 104 of FIG. 1, in some embodiments the network information can include any suitable information related to a network connection used by the user device to stream the video content item, such as a bandwidth of the connection, a latency of the connection, a throughout and/or a goodput of the connection, a type of connection (e.g., 3G, 4G, Wi-Fi, Ethernet, and/or any other suitable type of connection), and/or any other suitable network information. As described above in connection with block 104 of FIG. 1, in some embodiments, the device information can include any suitable information related to the user device, such as a model or type of user device, an operating system used by the user device, a size or resolution of a display associated with the user device, a size of a viewport of a video player window on the user device that is to be used to present the video content item, and/or any other suitable device information. Additionally, in some embodiments, process 300 can receive any suitable information related to the video content item (e.g., a topic or genre associated with the video content item, a duration of the video content item, a popularity of the video content item, and/or any other suitable video content item information), information related to a user of the user device (e.g., billing information associated with the user, information related to a subscription of the user to a video content streaming service providing the video content item, information indicating previous playback history of the user, and/or any other suitable user information), and/or information indicating formats or resolutions of video content items previously selected by the user of the user device to stream other video content items.

At 308, process 300 can evaluate the trained model using the network information, device information, user information, and/or video content item information to calculate a group of predicted quality scores corresponding to different formats in a group of potential formats. Note that, in some embodiments, the group of potential formats can include any suitable formats, such as different available resolutions of the video content item (e.g., 144 pixels×256 pixels, 240 pixels×426 pixels, 360 pixels×640 pixels, 480 pixels×854 pixels, 720 pixels×1280 pixels, 1080 pixels×1920 pixels, and/or any other suitable resolutions). Note that, in some embodiments, the group of potential formats can include any suitable number (e.g., one, two, three, five, ten, and/or any other suitable number) of potential formats. A specific example of a group of predicted quality scores corresponding to a group of potential formats can be: [144 pixels×256 pixels, 0.2; 240 pixels×426 pixels, 0.4; 360 pixels×640 pixels, 0.7; 480 pixels×854 pixels, 0.5; 720 pixels×1280 pixels, 0.2; 1080 pixels×1920 pixels, 0.1], indicating a highest predicted quality score for the format corresponding to a resolution of 360 pixels×640 pixels.

Note that, in some embodiments, process 300 can evaluate the trained model using any suitable combination of input features. For example, in some embodiments, the trained model can use any combination of input features including any suitable network quality metrics (e.g., a bandwidth of a network connection, a latency of the network connection, a throughput or a goodput of the network connection, and/or any other suitable network quality metrics), device information (e.g., a type or model of the user device, an operating system being used by the user device, a display size or resolution of a display associated with the user device, a viewport size of a video player window used to present the video content item, a geographic location of the user device, and/or any other suitable device information), user information (e.g., previously selected formats, information indicating subscriptions purchased by the user of the user device, and/or any other suitable user information), and/or video content item information (e.g., a genre or topic of the video content item, a duration of the video content item, a popularity of the video content item, and/or any other suitable video content item information). In some embodiments, in instances in which the trained model is a decision tree, process 300 can evaluate the trained model using input features selected during training of the decision tree. As a more particular example, a group of input features can include a current goodput of a network connection used by the user device, an operating system used by the user device, and a current geographic location used by the user device.

At 310, process 300 can select the format of the group of potential formats corresponding based on the predicted quality score for each potential format. For example, in some embodiments, process 300 can select the format of the group of potential formats corresponding to the highest predicted quality score. As a more particular example, continuing with the example given above of potential formats and corresponding predicted quality scores of: [144 pixels×256 pixels, 0.2; 240 pixels×426 pixels, 0.4; 360 pixels×640 pixels, 0.7; 480 pixels×854 pixels, 0.5; 720 pixels×1280 pixels, 0.2; 1080 pixels×1920 pixels, 0.1], process 300 can select the format corresponding to the resolution of 360 pixels×640 pixels.

Figure 4:
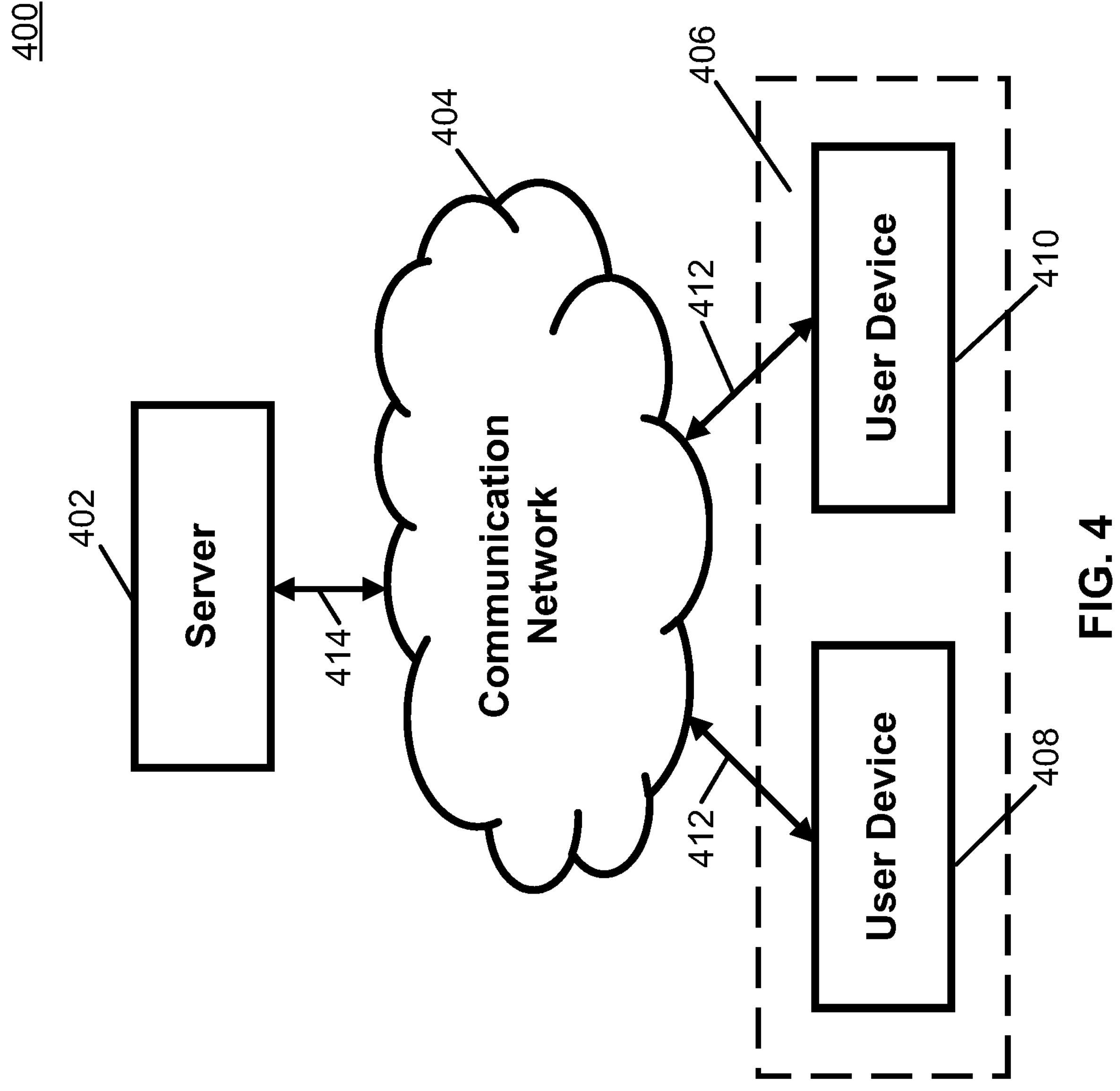
FIG. 4 shows a schematic diagram of an illustrative system suitable for implementation of mechanisms described herein for selecting formats for streaming media content items in accordance with some embodiments of the disclosed subject matter.

Turning to FIG. 4, an illustrative example 400 of hardware for selecting formats for streaming media content items that can be used in accordance with some embodiments of the disclosed subject matter is shown. As illustrated, hardware 400 can include a server 402, a communication network 404, and/or one or more user devices 406, such as user devices 408 and 410.

Server 402 can be any suitable server(s) for storing information, data, programs, media content, and/or any other suitable content. In some embodiments, server 402 can perform any suitable function(s). For example, in some embodiments, server 402 can select a format for a video content item to be streamed to a user device using a trained model that predicts an optimal video content item format, as shown in and described in FIG. 1. In some embodiments, server 402 can train a model that predicts an optimal video content item format, as shown in and described below in connection with FIGS. 2 and 3. For example, as shown in and described below in connection with FIG. 2, server 402 can train a model that predicts an optimal video content item format based on formats that were previously selected by users. As another example, as shown in and described below in connection with FIG. 3, server 402 can train a model that predicts an optimal video content item format based on quality scores associated with streaming video content items at different formats.

Communication network 404 can be any suitable combination of one or more wired and/or wireless networks in some embodiments. For example, communication network 404 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 406 can be connected by one or more communications links (e.g., communications links 412) to communication network 404 that can be linked via one or more communications links (e.g., communications links 414) to server 402. The communications links can be any communications links suitable for communicating data among user devices 406 and server 402 such as network links, dial-up links, wireless links, hard-wired links, any other suitable communications links, or any suitable combination of such links.

User devices 406 can include any one or more user devices suitable for streaming media content. In some embodiments, user device 406 can include any suitable type of user device, such as mobile phones, tablet computers, wearable computers, laptop computers, desktop computers, smart televisions, media players, game consoles, vehicle information and/or entertainment systems, and/or any other suitable type of user device.

Although server 402 is illustrated as one device, the functions performed by server 402 can be performed using any suitable number of devices in some embodiments. For example, in some embodiments, multiple devices can be used to implement the functions performed by server 402.

Although two user devices 408 and 410 are shown in FIG. 4 to avoid over-complicating the figure, any suitable number of user devices, and/or any suitable types of user devices, can be used in some embodiments.

Figure 5:
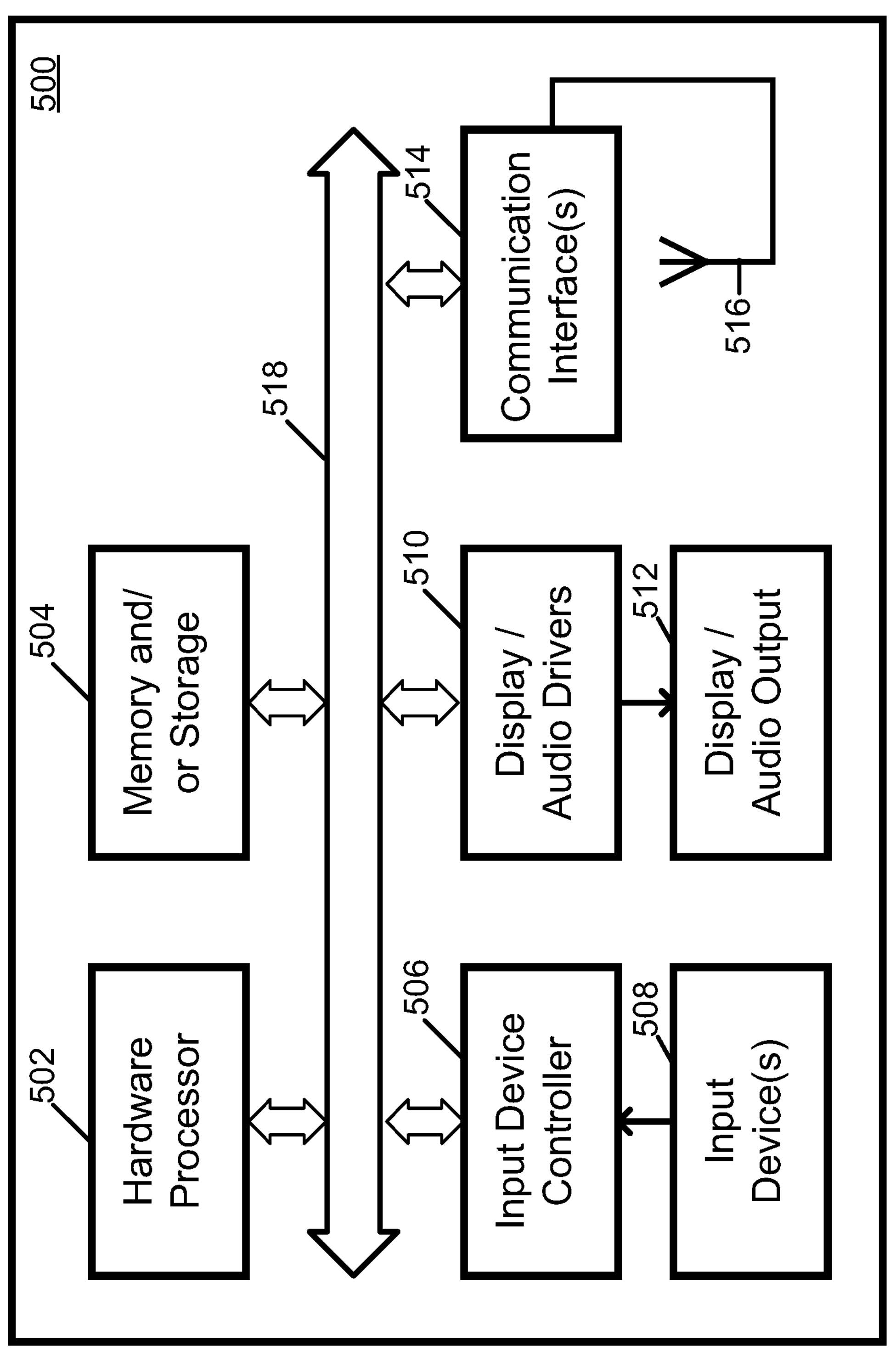
FIG. 5 shows a detailed example of hardware that can be used in a server and/or a user device of FIG. 4 in accordance with some embodiments of the disclosed subject matter.

Server 402 and user devices 406 can be implemented using any suitable hardware in some embodiments. For example, in some embodiments, devices 402 and 406 can be implemented using any suitable general-purpose computer or special-purpose computer. For example, a mobile phone may be implemented using a special-purpose computer. Any such general-purpose computer or special-purpose computer can include any suitable hardware. For example, as illustrated in example hardware 500 of FIG. 5, such hardware can include hardware processor 502, memory and/or storage 504, an input device controller 506, an input device 508, display/audio drivers 510, display and audio output circuitry 512, communication interface(s) 514, an antenna 516, and a bus 518.

Hardware processor 502 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 502 can be controlled by a server program stored in memory and/or storage of a server, such as server 402. In some embodiments, hardware processor 502 can be controlled by a computer program stored in memory and/or storage 504 of user device 406.

Memory and/or storage 504 can be any suitable memory and/or storage for storing programs, data, and/or any other suitable information in some embodiments. For example, memory and/or storage 504 can include random access memory, read-only memory, flash memory, hard disk storage, optical media, and/or any other suitable memory.

Input device controller 506 can be any suitable circuitry for controlling and receiving input from one or more input devices 508 in some embodiments. For example, input device controller 506 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 510 can be any suitable circuitry for controlling and driving output to one or more display/audio output devices 512 in some embodiments. For example, display/audio drivers 510 can be circuitry for driving a touchscreen, a flat-panel display, a cathode ray tube display, a projector, a speaker or speakers, and/or any other suitable display and/or presentation devices.

Communication interface(s) 514 can be any suitable circuitry for interfacing with one or more communication networks (e.g., computer network 404). For example, interface(s) 514 can include network interface card circuitry, wireless communication circuitry, and/or any other suitable type of communication network circuitry.

Antenna 516 can be any suitable one or more antennas for wirelessly communicating with a communication network (e.g., communication network 404) in some embodiments. In some embodiments, antenna 516 can be omitted.

Bus 518 can be any suitable mechanism for communicating between two or more components 502, 504, 506, 510, and 514 in some embodiments.

Any other suitable components can be included in hardware 500 in accordance with some embodiments.

In some embodiments, at least some of the above described blocks of the processes of FIGS. 1-3 can be executed or performed in any order or sequence not limited to the order and sequence shown in and described in connection with the figures. Also, some of the above blocks of FIGS. 1-3 can be executed or performed substantially simultaneously where appropriate or in parallel to reduce latency and processing times. Additionally or alternatively, some of the above described blocks of the processes of FIGS. 1-3 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for selecting formats for streaming media content items are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for selecting formats for streaming video content items, the method comprising:

receiving, at a server from a user device, a request to begin streaming a video content item on the user device;

receiving, from the user device, network information indicating a quality of a network connection used by the user device to stream the video content item and device information related to the user device;

predicting, using a trained model, an initial format for the video content item based on the network information and the device information, wherein the trained model is trained using training samples each corresponding to a previously streamed video content item and comprising (i) prior network and device information associated with the previously streamed video content item, and (ii) a previously selected format for the previously streamed video content item associated with the prior network and device information, wherein a previously selected format corresponds to a resolution in at least one of the training samples that comprises a history of a plurality of user-selected resolutions during a video streaming session of a respective previously streamed video content item;

selecting, by the server, a first format for the video content item, wherein the first format includes a first resolution of a plurality of resolutions based on the predicted initial format for the video content item;

transmitting, from the server, a first portion of the video content item having the first format to the user device;

receiving, at the server from the user device, updated network information and updated device information;

predicting, using the trained model, an updated format for the video content item based on the updated network information and the updated device information;

selecting, by the server, a second format for the video content item, wherein the second format includes a second resolution of the plurality of resolutions based on the predicted updated format for the video content item; and transmitting, from the server, a second portion of the video content item having the second format to the user device.

2. The method of claim 1, wherein the predicted initial format is a format likely to be selected by a user of the user device.

3. The method of claim 1, wherein selecting the first format for the video content item comprises identifying, by the server, a format that maximizes a predicted duration of time a user of the user device will stream video content items.

4. The method of claim 1, wherein the updated device information includes an indication that a size of a viewport of a video player window executing on the user device in which the video content item is being presented has changed.

5. The method of claim 4, wherein the updated device information indicates that the size of the viewport has decreased, and wherein the second resolution is lower than the first resolution.

6. The method of claim 1, wherein the first format for the video content item is selected based on a genre of the video content item.

7. The method of claim 1, wherein the plurality of user-selected resolutions were selected by a user of the user device.

8. A system for selecting formats for streaming video content items, the system comprising:

a memory; and a hardware processor that, when executing computer-executable instructions stored in the memory, is configured to:

receive, at a server from a user device, a request to begin streaming a video content item on the user device;

receive, from the user device, network information indicating a quality of a network connection used by the user device to stream the video content item and device information related to the user device;

predict, using a trained model, an initial format for the video content item based on the network information and the device information, wherein the trained model is trained using training samples each corresponding to a previously streamed video content item and comprising (i) prior network and device information associated with the previously streamed video content item, and (ii) a previously selected format for the previously streamed video content item associated with the prior network and device information, wherein a previously selected format corresponds to a resolution in at least one of the training samples that comprises a history of a plurality of user-selected resolutions during a video streaming session of a respective previously streamed video content item;

select, by the server, a first format for the video content item, wherein the first format includes a first resolution of a plurality of resolutions based on the predicted initial format for the video content item;

transmit, from the server, a first portion of the video content item having the first format to the user device;

receive, at the server from the user device, updated network information and updated device information;

predict, using the trained model, an updated format for the video content item based on the updated network information and the updated device information;

select, by the server, a second format for the video content item, wherein the second format includes a second resolution of the plurality of resolutions based on the predicted updated format for the video content item; and transmit, from the server, a second portion of the video content item having the second format to the user device.

9. The system of claim 8, wherein the predicted initial format is a format likely to be selected by a user of the user device.

10. The system of claim 8, wherein selecting the first format for the video content item comprises identifying, by the server, a format that maximizes a predicted duration of time a user of the user device will stream video content items.

11. The system of claim 8, wherein the updated device information includes an indication that a size of a viewport of a video player window executing on the user device in which the video content item is being presented has changed.

12. The system of claim 11, wherein the updated device information indicates that the size of the viewport has decreased, and wherein the second resolution is lower than the first resolution.

13. The system of claim 8, wherein the first format for the video content item is selected based on a genre of the video content item.

14. The system of claim 8, wherein the plurality of user-selected resolutions were selected by a user of the user device.

15. A non-transitory computer-readable medium containing computer-executable instructions that, when executed by a processor, cause the processor to perform a method for selecting formats for streaming video content items, the method comprising:

receiving, at a server from a user device, a request to begin streaming a video content item on the user device;

receiving, from the user device, network information indicating a quality of a network connection used by the user device to stream the video content item and device information related to the user device;

predicting, using a trained model, an initial format for the video content item based on the network information and the device information, wherein the trained model is trained using training samples each corresponding to a previously streamed video content item and comprising (i) prior network and device information associated with the previously streamed video content item, and (ii) a previously selected format for the previously streamed video content item associated with the prior network and device information, wherein a previously selected format corresponds to a resolution in at least one of the training samples that comprises a history of a plurality of user-selected resolutions during a video streaming session of a respective previously streamed video content item;

selecting, by the server, a first format for the video content item, wherein the first format includes a first resolution of a plurality of resolutions based on the predicted initial format for the video content item;

transmitting, from the server, a first portion of the video content item having the first format to the user device;

receiving, at the server from the user device, updated network information and updated device information;

predicting, using the trained model, an updated format for the video content item based on the updated network information and the updated device information;

selecting, by the server, a second format for the video content item, wherein the second format includes a second resolution of the plurality of resolutions based on the predicted updated format for the video content item; and transmitting, from the server, a second portion of the video content item having the second format to the user device.

16. The non-transitory computer-readable medium of claim 15, wherein the predicted initial format is a format likely to be selected by a user of the user device.

17. The non-transitory computer-readable medium of claim 15, wherein selecting the first format for the video content item comprises identifying, by the server, a format that maximizes a predicted duration of time a user of the user device will stream video content items.

18. The non-transitory computer-readable medium of claim 15, wherein the updated device information includes an indication that a size of a viewport of a video player window executing on the user device in which the video content item is being presented has changed.

19. The non-transitory computer-readable medium of claim 18, wherein the updated device information indicates that the size of the viewport has decreased, and wherein the second resolution is lower than the first resolution.

20. The non-transitory computer-readable medium of claim 15, wherein the first format for the video content item is selected based on a genre of the video content item.

21. The non-transitory computer-readable medium of claim 15, wherein the plurality of user-selected resolutions were selected by a user of the user device.

* * * * *